United States Patent [19]

Tabler

[11] 4,214,864
[45] Jul. 29, 1980

[54] CONTINUOUS MOLDING APPARATUS WITH COVER BELT

[75] Inventor: Charles P. Tabler, Hamilton, Ohio

[73] Assignee: Kornylak Corporation, Hamilton, Ohio

[21] Appl. No.: 914,740

[22] Filed: Jun. 12, 1978

[51] Int. Cl.² ............................................. B29D 27/00
[52] U.S. Cl. .................................. 425/329; 425/371; 425/817 C
[58] Field of Search .................. 425/329, 371, 817 C, 425/4 C, 115, 224; 264/51, 53, 54; 198/626

[56] References Cited

U.S. PATENT DOCUMENTS

| | | | |
|---|---|---|---|
| 2,817,875 | 12/1957 | Harris et al. | 425/329 |
| 2,836,285 | 5/1958 | Muller | 198/626 |
| 2,929,793 | 3/1960 | Hirsh | 425/817 C |
| 3,408,690 | 11/1968 | Jacob | 425/4 C |
| 3,700,368 | 10/1972 | Wells | 425/4 C |
| 3,824,057 | 7/1974 | Kornylak et al. | 425/371 |
| 3,830,604 | 8/1974 | Korpela | 425/371 |
| 3,914,084 | 10/1975 | Kornylak | 425/371 |
| 3,994,648 | 11/1976 | Kornylak et al. | 425/371 |

FOREIGN PATENT DOCUMENTS

| | | | |
|---|---|---|---|
| 543831 | 1/1956 | Belgium | 198/626 |
| 1125852 | 3/1962 | Fed. Rep. of Germany | 425/371 |
| 2113988 | 10/1972 | Fed. Rep. of Germany | 425/329 |
| 1267633 | 12/1961 | France | 198/626 |

Primary Examiner—James B. Lowe
Attorney, Agent, or Firm—Thomas E. Beall, Jr.

[57] ABSTRACT

Rigid synthetic foam is expanded, molded and cured in an endless mold formed by opposed spaced horizontal belt conveyors with side dams. To obtain a smooth finish on the products, a top cover belt and a bottom cover belt are employed to span the rigid slats of the conveyors, respectively. The top cover belt is stretched tightly and smoothly when the endless conveyors approach each other at the entrance to the pressure mold, by means of a downwardly depending continuous wedge shaped member along each side margin of the cover belt that cooperates with an upwardly opening correspondingly wedge shaped recess in the side dams. To obtain different thickness products, spacer blocks may be employed between the side dam and the lower conveyor.

12 Claims, 3 Drawing Figures

U.S. Patent  Jul. 29, 1980  4,214,864
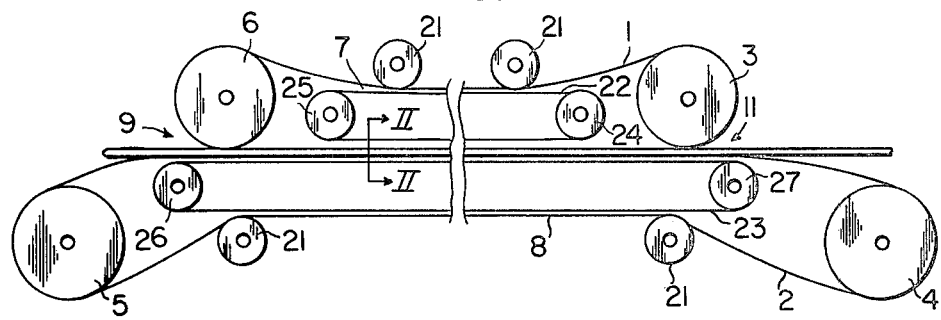
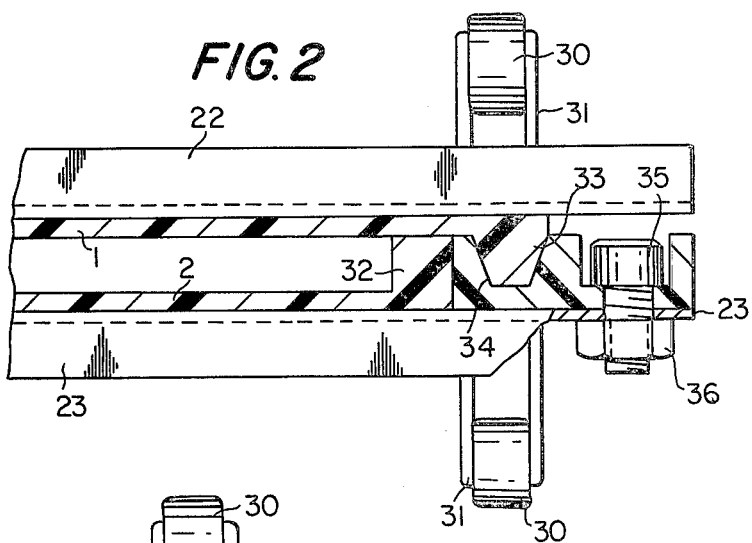
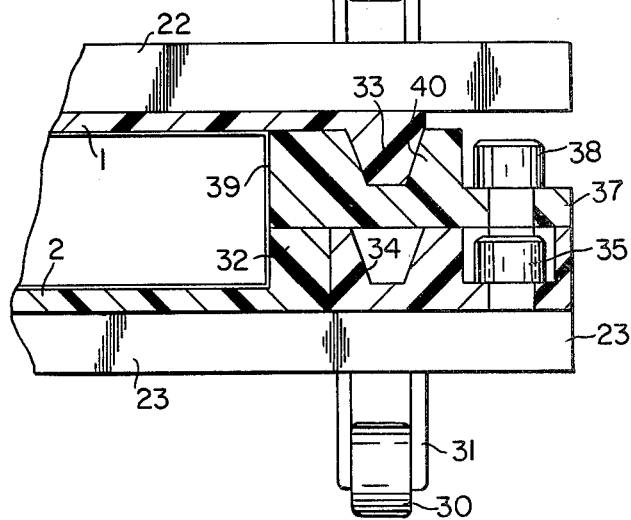

CONTINUOUS MOLDING APPARATUS WITH COVER BELT

BACKGROUND OF THE INVENTION

The present invention relates to the pressure molding of synthetic foam resin. Specifically, the top surface of the product is provided with a smooth finish by means of a cover belt that spans the individual rigid slats of the top conveyor.

Such a type of molding apparatus is shown in U.S. Pat. No. 3,824,057, issued to Andrew T. Kornyalk and Charles P. Tabler, July 16, 1974. The disclosure of this patent is incorporated herein by reference for background material as to the construction of the upper and lower rigid conveyors, and the operation of the molding apparatus in producing an endless product. One difficulty with this type of molding apparatus is that the upper belt engages the side dams and is clamped between the top and bottom rigid conveyors before the resin has fully expanded, so that with the usual width of 4 to 10 feet for such conveyors, there's a large unsupported central area of the top belt that tends to sag, because this belt is usually constructed of a resilient material, such as rubber or urethane. Thereafter, when the product expands and fills the pressure mold, a crease, wrinkle, or the like will be formed in the belt and consequently in the product.

SUMMARY

It is an object of the present invention to tightly stretch and clamp the top belt of a pressure mold for forming foam synthetic resin, so as to obtain a smooth uninterrupted top surface for the final product. To accomplish this the top belt is first laterally stretched prior to or as it is clamped between the top and bottom rigid conveyors at the entrance end of the mold.

Specifically, it is preferable to accomplish such clamping by forming the top cover belt with a downwardly depending wedge shaped member along each of its longitudinal edges, which will cooperate with a correspondingly shaped upwardly opening channel or recess in the side dams, so that as the top and bottom rigid conveyors are brought together, the wedge surfaces will laterally stretch the top cover belt as it is being clamped.

BRIEF DESCRIPTION OF THE DRAWING

Further objects, features and advantages of the present invention will become more clear from the following detailed description of a preferred embodiment, as shown in the accompanying drawing, wherein:

FIG. 1 is a schematic side elevation view of a molding apparatus employing the features of the present invention;

FIG. 2 is a partial cross-sectional view taken along line II—II FIG. 1; and

FIG. 3 is a partial cross-sectional view, of the apparatus shown in FIG. 2 with the addition of a spacer block to obtain a thicker final product than is obtained with the apparatus of FIG. 2.

DETAILED DESCRIPTION

While the rigid conveyors may be of any type, for example a chain and slat construction, as a specific example, the rigid conveyors may be constructed according to the above-mentioned U.S. Pat. No. 3,824,057 and the patent to Andrew T. Kornylak, U.S. Pat. No. 3,082,061, issued Mar. 26, 1963, the disclosure of which is incorporated herein in its entirety for the construction of such rigid type conveyors. The formed product may be a self-skinned, or laminated rigid polyurethane foam, or some other product, for example set forth in the above-mentioned patents.

As shown in FIG. 1, the molding apparatus includes a top endless and flexible cover belt 1, a bottom, endless and flexible cover belt 2 that will respectively engage the top and bottom of the endless product sheet as it is being formed. The top cover belt 1 is guided around drive or driven exit roller 3 and entrance roller 6, whereas the bottom cover belt 2 is guided around exit roller 4 and entrance roller 5. Each of these belts have runs where they are closely adjacent to each other and traveling in the same direction to form the pressure mold, and return runs 7, 8 between their rollers.

At the entrance end 9 of the pressure mold, a mixture of foamable resin is deposited on the bottom belt 2, for example, so that it will expand and cure within the mold to exit at the exit end 11 of the apparatus as a continuous sheet of rigid product, which then may be cut up into desired lengths. A plurality of additional rollers 21 may be provided at suitable locations to support the cover belts.

Since the pressure within the mold may be approximately 3 to 5 pounds per square inch, the flexible cover belts are backed up by rigid endless conveyors. The top rigid endless conveyor 22 is guided around driving or driven sprockets 24 or 25, whereas the bottom rigid endless conveyor 23 is guided around driving or driven sprockets 26, 27.

Since the construction of the molding apparatus set forth above is well known in the prior art and may take on different constructions, further details of its construction will not be set forth.

As shown in FIG. 2, each of the top and bottom endless rigid conveyors is provided with a plurality of guide and support rollers 30, carried by brackets 31 that are welded or otherwise secured to the individual slats of the conveyors, in a known manner. To form the sides of the pressure mold, there is provided a side dam 32, which in the preferred embodiment is integrally formed with the bottom belt 2 by vulcanizing, or adhesively securing a flexible rectangular strip to each lateral side of the bottom belt 2. When the upper and lower rigid conveyors 22 and 23 are brought together at the entrance end of the apparatus, the side dam 32 will clamp the belts 1 and 2 between the rigid conveyors to securely form the pressure mold and prevent any leakage of materials laterally from between the belts.

According to the present invention, the top belt is laterally stretched as the rigid conveyors are brought together at the entrance end of the mold immediately prior to clamping. To accomplish this, each side (only one side being shown) of the top belt 1 is provided with a downwardly depending wedge strip or wedge member 33. The member 33 is preferably constructed as a V-belt bonded to the side of the top cover belt 1. The bottom cover belt, or as shown in the preferred embodiment, the bottom rigid conveyor 23 is provided with an upwardly opening wedge-shaped slot 34 having a configuration that is complementary to the configuration of the downwardly depending wedge-shaped member 33. Thus, it is seen that the wedge or cam members 33, 34 will accurately fix the location of the sides of the top cover belt 1, and the dimensioning is such that the top cover belt 1 will be tightly stretched, in the lateral direction (transverse to the longitudinal conveying direction).

While opposed side wedge surfaces have been shown for each of the members 33, 34, only the innermost wedge surfaces may be employed according to a modification, since it is these surfaces that will insure that the top cover belt is tightly stretched during its clamping at the entrance end 9 of the mold.

The bottom wedge or cam member having the slot or recessed 34 may be formed as a continuous extruded resilient strip having the cross-sectional configuration shown in FIG. 2, and secured in an endless loop along the corresponding side edge of the conveyor 23 by means of a plurality of longitudinally spaced bolt 35 and nut 36 combinations.

It is seen that the apparatus set up in FIG. 2 will accurately form a product within its mold of a fixed height, for example ½ inch. With a stretching and tight clamping of the top cover belt, such product will have a smooth upper surface. If it is desired to form a product having a different height, the apparatus may be shut down, the conveyors moved apart, and a spacer block employed as shown in FIG. 3. In FIG. 3, a spacer block 37 is secured to the top of the wedge member having the slot 34 and the top of the dam 32. The spacer member 37 is formed by a continuously extruded rigid strip having the cross-section configuration as shown in FIG. 3 and secured in a loop along the marginal edge of the bottom conveyor 23. The spacer member 37 is thus secured by means of a plurality of bolts 38 that are spaced from each other and passed through a corresponding plurality of holes in the side flange of the spacer member 37. Preferably, each of the bolts 35 is provided with an upwardly opening threaded recess for receipt of the correspondingly threaded bolts 38. In this manner, it is not necessary to disassemble any portion of the structure shown in FIG. 2, to add the spacer block shown in FIG. 3. Of course, different means for assembling may be provided.

As shown in FIG. 3, the spacer block 37 is provided with an inside vertical surface that is aligned with the inside vertical surface of the side dam 32, so that together they will accurately form the side edge of the product. Of course, different configurations may be provided for the side edge 39 and for the dam 32, for example, to provide a tongue on one side and a groove on the other side of the product, so that sheets of the product may be secured together with a tongue and groove connection when used as building panels, for example.

The spacer member 37 is provided with an upwardly opening wedge recess or slot 40, which is identical to the wedge slot 34, for cooperation with the downwardly depending cam or wedge member 33 of the upward belt 1, in the manner and for the reasons previously described.

As shown in FIG. 3, the spacer block 37 has an inner portion that overlies the side dam 32. If the cover belt 2 remains with the bottom conveyor 23 at all times (contrary to the showing in FIG. 1) there will be no problem with its construction. However, with the cover belt 2 separating from the bottom conveyor 23 as shown between exit roller 4 and drive sprocket 27, for example, there is a problem of interference. This interference problem, where present, is solved by splitting the bottom rigid conveyor 23 into two laterally adjacent endless conveyor portions that may be moved laterally toward and away from each other so that the bottom conveyor portions are moved away from each other at the exit end 11 a sufficient distance so that the block 37 no longer lies above the dam 32 prior to the bottom conveyor 23 passing around sprocket 27. The manner of constructing the bottom conveyor including controls for such side shifting, is fully disclosed in the U.S. Pat. No. 3,824,057 issued July 16, 1974, to Andrew T. Kornylak and Charles P. Tabler, the disclosure of which is incorporated herein in its entirety. At the entrance end 7, both portions of the bottom conveyor will move towards each other so that the spacer block 37 may pass over the side dam 32 to assume the position shown in item FIG. 3. During the lateral shifting of the bottom conveyor portions, the cover belt and side dams 32 will have no lateral movement.

The operation of the present invention is clear from the previously mentioned patents and from the description set forth above.

While preferred embodiments of the present invention have been shown in the drawing and set forth in the description in considerable detail for purposes of illustration and the advantages of their details, it is contemplated that further embodiments, modifications and variations may be produced according to the broader aspects of the present invention, all as determined by the spirit and scope of the following claims.

What is claimed:

1. Apparatus for the continuous molding of a product, comprising:
   a first endless rigid molding conveyor and a second opposed endless rigid molding conveyor having adjacent runs through a molding zone;
   an endless side dam traveling between each side margin respectively, of the molding conveyors along the adjacent runs in the molding zone so as to close the sides of the molding zone and form a moving pressure mold adapted to receive a material to be molded at its entrance end and confine the material within the pressure mold until it is expelled at the exit end of the mold;
   an endless flexible cover belt passing between the first and second rigid conveyors along the adjacent runs so as to overline and separate the product from one of the rigid conveyors, and said cover belt, along one of its longitudinal sides, with respect to the conveying direction, having a first cam means;
   a second cam means carried by the other of said endless conveyors along one of its longitudinal sides in opposition to said first cam means at least along said adjacent runs for engaging said first cam means, moving relatively toward said first cam means and thereby wedging said first cam means laterally outward from the central longitudinal axis of the mold as the endless conveyors approach each other at the entrance of the mold to thereby tightly hold the top cover belt in a fully extended position throughout the molding zone;
   said cover belt, along the other of its longitudinal sides, with respect to the conveying direction, having first fixing means; and
   second fixing means carried by at least one of said endless conveyors along the other of its longitudinal sides in opposition to said first fixing means at least along said adjacent runs for engaging said first fixing means as the endless conveyors approach each other at the entrance of the mold to thereby fix the other longitudinal side of said cover belt during the engagement of said first and second cam means.

2. The apparatus of claim 1, wherein said first endless rigid conveyor is a top conveyor, and said other conveyor is a bottom conveyor; said top and bottom conveyors, within the molding zone, forming vertically spaced apart horizontal generally planar surfaces of plural rigid conveyor slats; and said cover belt engaging and spanning the slats of the top conveyor so as to present a smooth uninterrupted surface to the product within the pressure mold.

3. The apparatus of claim 2, further including a second cover belt overlying said bottom conveyor, and said second cover belt, along each of its longitudinal edges, having an upstanding end strip at least partially forming the respective side dams.

4. The apparatus of claim 3, wherein said second cam means is rigidly secured along the one side edge of said other endless rigid conveyor.

5. The apparatus of claim 4, wherein said second cam means laterally abuts the adjacent side of said second cover belt and upstanding end strip, and is of the same height, as measured vertically between said conveyors.

6. The apparatus of claim 5, further including, on the longitudinal side opposite from the first mentioned cam means, a second set of a first cam means and a second cam means substantially mirror images to the first mentioned cam means.

7. The apparatus of claim 6, further including a spacer strip releasably secured between both said side dam and second cam means, and said first cam means along at least the one side of said conveyors; and said spacer member having cam means identical to said second cam means for engaging said first cam means.

8. The apparatus of claim 2, further including on the longitudinal side opposite from the first mentioned cam means, a second set of a first cam means and a second cam means substantially mirror images to the first mentioned cam means.

9. The apparatus of claim 2, further including a spacer strip releasably secured between both said side dam and second cam means, and said first cam means along at least the one side of said conveyors; and said spacer member having cam means identical to said second cam means for engaging said first cam means.

10. The apparatus of claim 5, further including a spacer strip releasably secured between both said side dam and second cam means, and said first cam means along at least the one side of said conveyors; and said spacer member having cam means identical to said second cam means for engaging said first cam means.

11. The apparatus of claim 1, wherein said cam means each include an endless wedge surface, with the second cam means wedge surface being fixed relative to its rigid conveyor, and said first cam means wedge surface engaging the wedge surface of said second cam means and shifting laterally outward as said rigid conveyors approach each other vertically at the entrance end of the molding zone.

12. The apparatus of claim 11, further including, a spacer strip releasably secured between both said side dam and second cam means, and said first cam means along at least the one side of said conveyors; and said spacer member having cam means identical to said second cam means for engaging said first cam means.

* * * * *